Patented Dec. 10, 1929

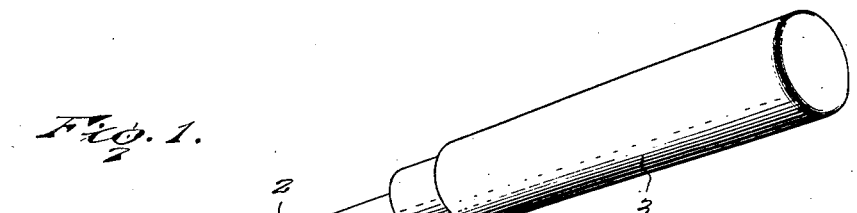
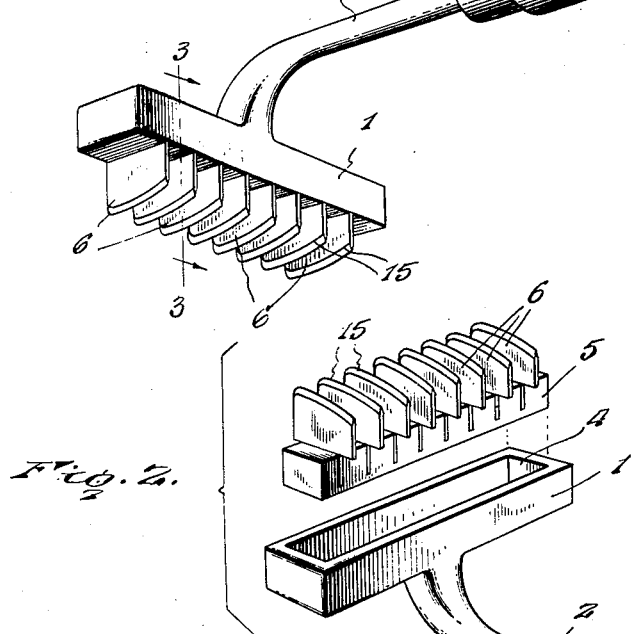
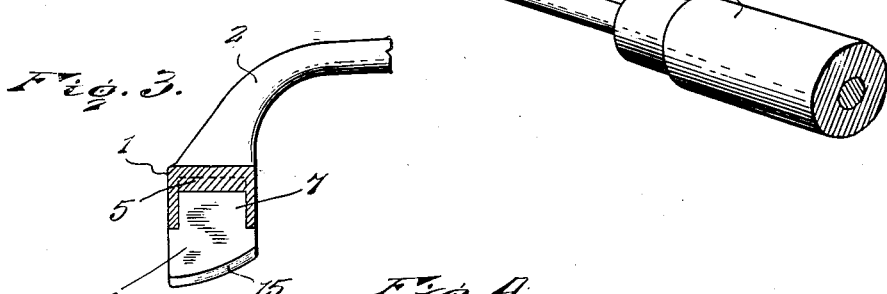
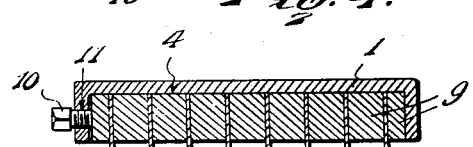
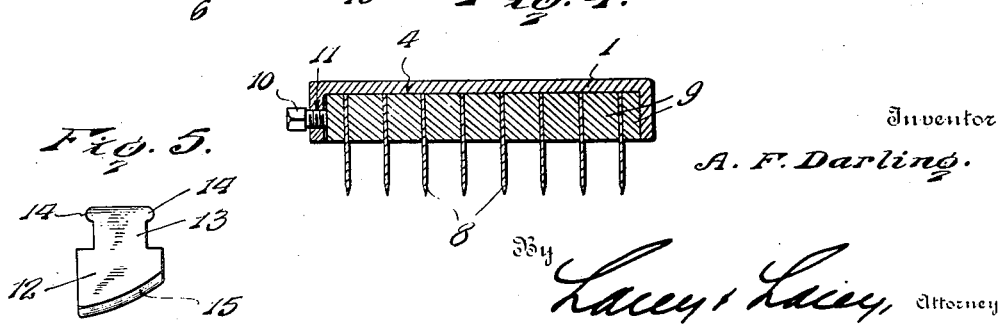

1,739,214

UNITED STATES PATENT OFFICE

AMY F. DARLING, OF BOSTON, MASSACHUSETTS

MEAT TENDERER

Application filed October 26, 1927. Serial No. 228,927.

This invention relates to kitchen utensils and more particularly to a device by means of which a steak, cutlet or other similar piece of meat may be rendered tender. At the present time it is customary to pound a steak which it is desired to tender but this causes the juices to be driven from the meat and, therefore, the meat juices and a part of the flavor are lost.

Therefore, one object of the invention is to provide a device by means of which a steak or cutlet may be made tender without causing the juices to be lost.

Another object of the invention is to provide a meat tenderer by means of which shallow cuts may be formed in the meat and thereby allow it to be rendered tender when cooked.

Another object of the invention is to provide a device of this character including a handle-engaging shank having a crosshead at its forward end in which a number of cutting blades or knives are secured in transversely spaced relation to each other.

Another object of the invention is to securely anchor the blades in the crosshead of the device so that they will be firmly held in place and prevented from moving out of proper spaced relation to each other and also retained substantially parallel to each other.

Another object of the invention is to firmly hold the blades in place within the crosshead but allow them to be removed when it is necessary to sharpen them or replace them with new blades.

The invention is illustrated in the accompanying drawing, wherein

Figure 1 is a perspective view of the improved meat tenderer;

Fig. 2 is a perspective view showing the meat tenderer in an inverted position with the blade-carrying block separated from the crosshead of the device;

Fig. 3 is a transverse sectional view through the crosshead taken on the line 3—3 of Fig. 1;

Fig. 4 is a longitudinal sectional view through the crosshead showing a modified construction;

Fig. 5 is a side elevation showing a slightly modified form of blade.

The improved meat tenderer includes a crosshead 1 which is preferably formed of cast aluminum, although other metals may be employed if so desired, and this crosshead carries a shank 2 which extends rearwardly from the crosshead intermediate its width and has its rear end portion embedded in a hand grip 3. A pocket 4 is formed in the crosshead and opens through the under face thereof, as shown in Fig. 2. This pocket is intended to receive a block 5 which is also preferably formed of cast aluminum or other metal having an affinity for the metal from which the crosshead is formed and is of such dimensions that it may be snugly received in the pocket. A plurality of blades 6 are carried by the block 5 and each is formed with a reduced shank 7 which extends the full width of the block and is embedded therein during molding of the block. By referring to Fig. 2, it will be seen that the blades project from opposite sides of the block so that, when the block is set into the pocket 4, the blades will overlie the side walls of the crosshead, as shown in Fig. 3. Therefore, the blades will be pressed against the lower edges of the opposed side walls of the crosshead and will not be subjected to strain which might work them loose when the device is in use. After the block has been set into the pocket 4, the device is subjected to heat which will cause the block and crosshead to be welded into an integral mass and become a unitary structure. It will thus be seen that once the block is welded into the pocket it cannot become detached from the crosshead and the blades will be firmly anchored in proper spaced and parallel relation to each other and cannot work loose.

In Fig. 4, there has been shown a modified construction. Referring to this figure, it will be seen that the blades 8 which have their shank portions received in the pocket 4 of the crosshead have blocks 9 which may be formed of wood or metal disposed between them and the blocks and blades are firmly held in place by a set screw 10 which is passed through a threaded opening 11 formed in one end wall of the crosshead and bears against one of the blocks 9. By tightening the set screw, pressure will be applied which will tightly bind the blocks and blades in the pocket. When this construction is employed, the set screw may be loosened and the blades easily removed so that they may be sharpened or thoroughly cleaned and also allow new blades to be substituted when the ones in use are worn out or become broken. It will be obvious that, if desired, a molded block, such as shown in Fig. 2, may be releasably held in the pocket by a set screw in the same manner that the blades and blocks shown in Fig. 4 are secured. The blade 12 shown in Fig. 5 is similar to those shown in the remaining figures, except that its shank 13 has its free end portion enlarged to provide side extensions 14 which serve to more firmly anchor the blades in a molded block.

When the device is in use, a steak or cutlet which it is desired to render tender is placed upon a table or other suitable support and the device grasped by the hand grip 3 and held with the blades projecting downwardly, as shown in Fig. 1. The device is moved longitudinally of the handle toward the operator and since the cutting edges 15 of the blades extend at an incline, as shown in Figs. 3 and 5, they will very easily slice the meat. Sufficient pressure will be applied to cause the blades to cut into the meat but the pressure will not be great enough to cause them to cut entirely through it. After cuts have been made in a steak in one direction it is turned and the device again employed to form cuts extending transversely across the first cuts. Both faces of the steak should be treated in a similar manner. When a steak or cutlet which has been treated as set forth above is cooked, it will be tender and will be palatable as it retains all of its juices whereas a steak which is beaten with a potato masher or the like before it is cooked has the juices driven from it and not only looses the juices but also looses a portion of its flavor.

Having thus described the invention, I claim:

A meat tenderer comprising a metal head having walls along its sides and ends and defining a pocket open at its bottom, a molded metal block fitted snugly into said pocket with its under surface flush with the edge faces of the walls, and knives spaced from each other longitudinally of the block with portions projecting from opposite sides thereof across the side walls of the pocket in contacting engagement therewith, said knives having shanks embedded in the block during molding thereof and rigidly held by the block, the block being fused into engagement with the walls of the pocket.

In testimony whereof I affix my signature.

AMY F. DARLING. [L. S.]